(12) United States Patent
Haustein et al.

(10) Patent No.: US 9,785,646 B2
(45) Date of Patent: Oct. 10, 2017

(54) DATA FILE HANDLING IN A NETWORK ENVIRONMENT AND INDEPENDENT FILE SERVER

(71) Applicant: International Business Machines Corporation, Armonk, NY (US)

(72) Inventors: Nils Haustein, Mainz (DE); Dominic Mueller-Wicke, Mainz (DE); Alexander Saupp, Mainz (DE); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 14/147,218

(22) Filed: Jan. 3, 2014

(65) Prior Publication Data

US 2014/0195575 A1      Jul. 10, 2014

(30) Foreign Application Priority Data

Jan. 4, 2013   (GB) .................................. 1300088.0

(51) Int. Cl.
*G06F 17/30* (2006.01)

(52) U.S. Cl.
CPC .... *G06F 17/30194* (2013.01); *G06F 17/3015* (2013.01)

(58) Field of Classification Search
CPC ..................... G06F 17/30156; G06F 17/30194
See application file for complete search history.

(56) References Cited

U.S. PATENT DOCUMENTS

| | | | |
|---|---|---|---|
| 2009/0083536 A1* | 3/2009 | Weis | .................. H04L 12/1886 713/153 |
| 2010/0070764 A1 | 3/2010 | Ishii et al. | |
| 2010/0094817 A1* | 4/2010 | Ben-Shaul | ............ G06F 3/0608 707/697 |
| 2011/0125720 A1 | 5/2011 | Jayaraman | |
| 2011/0218969 A1 | 9/2011 | Anglin et al. | |

(Continued)

OTHER PUBLICATIONS

Search Report from Great Britain Patent Application No. 1300088.0, dated Jul. 23, 2013.

(Continued)

*Primary Examiner* — Apu Mofiz
*Assistant Examiner* — Cindy Nguyen
(74) *Attorney, Agent, or Firm* — Zilka-Kotab, P.C.

(57) ABSTRACT

According to one embodiment, an independent file server connected to a wide area network (WAN) includes local file storage, a file system comprising information about directory structures, path, and file names of other file systems of other file servers connected to the WAN, and a deduplication module configured to communicate with other deduplication modules of other file servers connected to the WAN, perform data deduplication of data objects stored locally in the local file storage, and create and maintain a deduplication table mapping data chunks of locally stored data objects to identification characteristics and storage location in the local file storage, and construction plans of data files including locations of data chunks within the data files. Other systems, methods, and computer program products are presented according to more embodiments.

17 Claims, 3 Drawing Sheets

(56) References Cited

U.S. PATENT DOCUMENTS

2011/0258161 A1* 10/2011 Constantinescu ... G06F 11/1453
707/640
2011/0258239 A1 10/2011 Petrocelli
2012/0089578 A1 4/2012 Lam
2012/0110045 A1 5/2012 Takaoka et al.
2013/0305039 A1* 11/2013 Gauda ................ G06F 21/6218
713/153

OTHER PUBLICATIONS

Bardale, T., "Optimizing De-duplication Store and Network Traffic During Retrieve by Identifying and De-duplicating Similar Small Blocks Inside Chunk," Symantec Corporation, Jun. 9, 2011, 1 page.
Jung et al., "Design and Implementation of Deduplication Storage Server Using Stride Scheme," Grid and Distributed Computing, Communications in Computer and Information Science, 2011, vol. 261, pp. 475-483, abstract only.

* cited by examiner

DATA FILE HANDLING IN A NETWORK ENVIRONMENT AND INDEPENDENT FILE SERVER

RELATED APPLICATIONS

The present application claims priority to Great Britain Patent Application Serial No. 1300088.0, filed Jan. 4, 2011, which is herein incorporated by reference.

BACKGROUND

The present invention relates to data transfer in a wide area network (WAN) environment, and more specifically, the present invention relates to transferring data files between at least two independent file servers connected via a WAN, and an independent file server connected to a WAN configured for transferring data files.

WAN caching, such as Panache by IBM Corp., a parallel wide area network cache for remote file cluster, is able to mask the fluctuating WAN latencies and outages by supporting asynchronous and disconnected-mode operations. It allows for concurrent updates at one file server and at another remote file server, and resolves those updates by using conflict detection techniques to flag and handle conflicts.

A typical WAN caching environment according to the prior art comprises a first file server including a first file storage such as a hard disk drive (HDD) or solid state drive (SSD), and at least one first file system. Such a first file system may provide access to data files stored on the first file storage. The first file server is connected to a first user which reads and writes data files through the at least one first file system in the first file storage. Similarly, a second file server includes a second file storage such as a HDD or a SSD, and at least one second file system. The second file system is able to provide access to data files stored on the second file storage. The second file server is connected to a second user which reads and writes data files through the at least one second file system in the second file storage.

Both file servers are interconnected via a WAN. While a WAN is able to span large distances over hundreds and thousands of miles, its throughput and bandwidth is limited. Therefore, the file transfer between the two file servers underlies these WAN limitations.

In the prior art WAN caching environment, the at least one first file system of the first file server is able to provide access to data files stored in the second file system provided by the second file server without actually having these data files from the second file server present in the first local file storage. Thus, the first user connected to the first local file server sees all data files which are linked by the at least one first file system to the at least one second file system of the second file server. Only when the first user accesses such data files then the file is transmitted through the WAN from the second file server to the first file server if the data file is not already present in the first file server.

Likewise, data files stored in the first file storage of the first file servers may be seamlessly replicated to the second file server via the WAN. If the first file storage of the first file server gets full, then the data files which are already replicated to the second file server may be evicted from the first file storage. However, the first user connected to the first file server still sees these data files and when these data files are accessed, then this data file is transmitted from the second file server to the first file server.

Thus, WAN caching has the advantage that files may be stored in a remote location and are still visible locally without actually transmitting the files via the WAN. This reduces the required bandwidth and throughput requirements of a WAN and makes the usage of the WAN for file sharing purposes attractive.

Data deduplication according to the prior art has been introduced in a client-server environment, for example by Tivoli Storage Manager Version 6.2 by IBM Corp., and Avamar by EMC Corp. for client-server deduplication. The deduplication process first chunks a data object, such as a data file, and calculates an identity characteristic for each data chunk. Common methods used to calculate an identity characteristic are cryptographic hash functions, whereby each chunk of data is associated with a hash-digest. Cryptographic hash functions include Secure Hash Algorithm (SHA-1, SHA-256, SHA-512, etc.), Message Digest (MD5), etc.

The output of the hash function is called a "digest." The cryptographic hash function is an "avalanche function" in that a tiny difference (even 1 bit) in the input to the hash function results in a huge (highly non-linear) difference in the digest (output). The second step is to compare the hash-digest with the assumption that two identical hash-digests have identical chunks of data. In the third step, only the chunk with non-identical hash-digests are stored, the chunks with identical hash-digests are referenced to one instance of the chunk which is stored as well. Thus data deduplication reduces the required storage capacity for a given set of data by eliminating duplicative data.

Addressing hash collisions—where one hash-digest references two non-identical chunks of data—may be done by prior art methods including stronger hash algorithms, multiple (nested) hash algorithms per chunk, and binary comparison of the data chunks.

In a client-server deduplication environment, the client chunks the data and creates the hash-digests which are the output of the cryptographic hash functions and sends the hash-digests of the data chunks to the server. The server determines non-identical hash-digests and only requests data chunks with non-identical hash-digests. The client or the server stores the construction plan for the entire data based on the chunks. The construction plan describes the location of data chunks within a file. Thus with client-server deduplication, less data is being transferred between the client and the server.

As an alternate, the data may be deduplicated on a file basis, rather than on a chunk basis. The disadvantage of client-server deduplication is that it only works in one direction. Typically, the server keeps the main hash-digest repository and checks for identical hash-digests. The client does not store the hash-digest information and when data is being transmitted from the server to the client then the data is not deduplicated.

SUMMARY

According to one embodiment, a method for data file handling in a network environment includes receiving a request at a remote file server to read a data file located in a local file storage of a corresponding home file server, transmitting a request from the remote file server to the home file server for a first complete list of identification characteristics pertaining to the data file, creating the first complete list of identification characteristics for the data file in the home file server, transmitting the first complete list of identification characteristics from the home file server to the remote file server, creating a first list of missing identification characteristics in the remote file server by comparing the first complete list of identification characteristics with identification characteristics of data chunks of a deduplication table and determining missing identification characteristics of the data file in the remote file server, transmitting the first list of missing identification characteristics from the remote file server to the home file server, transmitting data chunks pertaining, to the first list of missing identification characteristics from the home file server to the remote file server, reconstructing the requested data file in the remote file server based on the first complete list of identification characteristics and location of data chunks within the data file, and providing access to the requested data file in the remote file server.

In another embodiment, an independent file server connected to a wide area network (WAN) includes local file storage, a file system comprising information about directory structures, path, and file names of other file systems of other file servers connected to the WAN, and a deduplication module configured to communicate with other deduplication modules of other file servers connected to the WAN, perform data deduplication of data objects stored locally in the local file storage, and create and maintain a deduplication table mapping data chunks of locally stored data objects to identification characteristics and storage location in the local file storage, and construction plans of data files including locations of data chunks within the data files.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

Preferred embodiments of the present invention, as described in detail below, are shown in the drawings.

DETAILED DESCRIPTION

Figure 1:
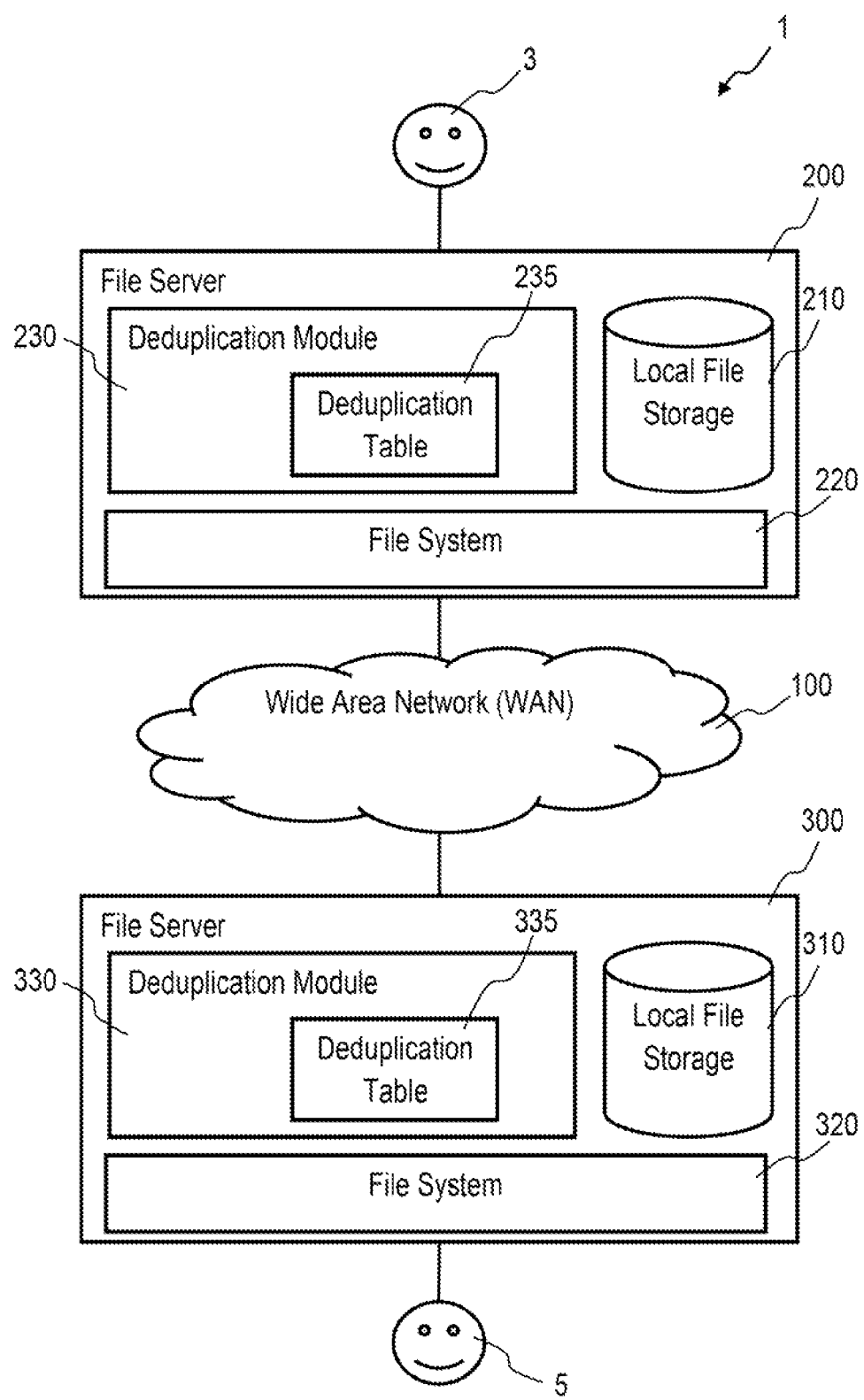
FIG. 1 is a schematic block diagram of a wide area network (WAN) environment having two independent file servers, in accordance with one embodiment.

In view of the circumstances described previously, in one embodiment, a method is described for writing a file to a plurality of media that reduces the time required for loading and/or unloading that occurs in reading of a plurality of media. Furthermore, a storage system that employs this method is also described according to more embodiments.

The present invention, according to one embodiment, relates to optimized data transfer in a wide area network (WAN) environment and specifically relates to a WAN caching environment. More particularly, according to one embodiment, the present invention relates to a system and a method for data deduplication in a WAN caching environment.

According to one general embodiment, a method for data file handling in a network environment includes receiving a request at a remote file server to read a data file located in a local file storage of a corresponding home file server, transmitting a request from the remote file server to the home file server for a first complete list of identification characteristics pertaining to the data file, creating, the first complete list of identification characteristics for the data file in the home file server, transmitting the first complete list of identification characteristics from the home file server to the remote file server, creating a first list of missing identification characteristics in the remote file server by comparing the first complete list of identification characteristics with identification characteristics of data chunks of a deduplication table and determining missing identification characteristics of the data file in the remote file server, transmitting the first list of missing identification characteristics from the remote file server to the home file server, transmitting data chunks pertaining to the first list of missing identification characteristics from the home file server to the remote file server, reconstructing the requested data file in the remote file server based on the first complete list of identification characteristics and location of data chunks within the data file, and providing access to the requested data file in the remote file server.

In another general embodiment, an independent file server connected to a WAN includes local file storage, a file system comprising information about directory structures, path, and file names of other file systems of other file servers connected to the WAN, and a deduplication module configured to communicate with other deduplication modules of other file servers connected to the WAN, perform data deduplication of data objects stored locally in the local file storage, and create and maintain a deduplication table mapping data chunks of locally stored data objects to identification characteristics and storage location in the local file storage, and construction plans of data files including locations of data chunks within the data files.

One technical problem with the prior art is to provide a method for transferring data files between at least two independent file servers and an independent file server, which are able to improve the usage of limited bandwidth of a WAN and to solve the above mentioned shortcomings and pain points of prior art WAN.

According to one embodiment, this problem is solved by providing a method for transferring data files between at least two independent the servers, an independent file server, a data processing program for transferring, data files between at least two independent file servers, and a computer program product for transferring data files between at least two independent file servers.

Accordingly, in one embodiment, a method is presented for data file handling in a network environment, wherein the network environment comprises at least two independent file servers connected via a network. Each file server comprises a local file storage, a file system, and a deduplication module, wherein a first file system of a first file server has information about directory structures, path, and file names of a second file system of a second file server, and the second file system of the second file server has information about directory structures, path, and file names of the first file system of the first file server; and wherein the deduplication modules are configured to communicate with each other and to create and to maintain deduplication tables mapping data chunks of locally stored data objects to identification characteristics and storage locations, and construction plans of data files based on the data chunks. Each data file is assigned to a certain independent file server acting as home file server for that corresponding data file, wherein a deduplication table of a home file server holds a complete set of identification characteristics for a corresponding data file stored in the local file storage, and wherein the first file server and the second file server are configured to act as home file server and remote file server for distinct, sets of data files.

The method comprises the steps of receiving a request in a remote file server to read a data file located in a local file storage of a corresponding home file server, transmitting a request for a first complete list of identification characteristics pertaining to the data file from the remote file server to the home file server, creating the first complete list of identification characteristics for the data file in the home file server, transmitting the first complete list of identification characteristics from the home file server to the remote file server, creating a first list of missing identification characteristics in the remote file server by comparing the first complete list of identification characteristics with identification characteristics of data chunks of the deduplication table and determining missing identification characteristics of the data file in the remote file server, transmitting the first list of missing identification characteristics from the remote file server to the home file server, transmitting data chunks pertaining to the first list of missing identification characteristics from the home file server to the remote file server, reconstructing the requested data the in the remote file server based on the first complete list of identification characteristics and location of data chunks within the data file, and providing access to the requested data file in the remote file server.

The method, in additional embodiments, may further comprise the steps of receiving a request in the remote file server to write the data file to the home file server, creating a second complete list of identification characteristics of the data file in the remote file server, transmitting the second complete list of identification characteristics from the remote file server to the home file server, creating a second list of missing identification characteristics in the home file server by comparing the second complete list of identification characteristics with identification characteristics of data chunks of the deduplication table and determining missing identification characteristics of the data file in the home file server, transmitting the second list of missing identification characteristics from the home file server to the remote file server, transmitting data chunks pertaining to the second list of missing identification characteristics from the remote file server to the target file server, and reconstructing the data file in the home file server based on the second complete list of identification characteristics and the locations of data chunks within the data file.

In further embodiments, the home file server may be determined as corresponding to a local file storage where the data file is created and stored first. In further embodiments, each read or write request may comprise a path and a file name of the requested data file. In more embodiments, the at least one read or write request may be generated based on a schedule.

In further embodiments, the at least one read or write request may be generated based on an event on the data file. In more embodiments, the event may be a write or update or delete operation. In further embodiments, the at least one read or write request may be generated based on a user command.

In additional embodiments, the deduplication module may chunk a data object and calculate an identification characteristic for each data chunk using a cryptographic hash-function, wherein each data chunk is associated with a digest output by the cryptographic hash-function. In further embodiments, the deduplication module may update a corresponding deduplication table whenever a new data file is written to a corresponding file server or a data file existing in the corresponding file server is changed or deleted.

In further embodiments, each deduplication table may comprise a first column with identification characteristic uniquely identifying a corresponding data chunk, a second column with storage location information of the corresponding data chunk in said local file storage, and a third column with file affiliation indicating to which files the corresponding data chunk belongs and at which file position the corresponding data chunk has to be placed. In more embodiments, the file affiliation of the third column may comprise an inode and an inode generation number of a corresponding data file and a file position at which the corresponding data chunk has to be placed.

In further embodiments, a data file may be derived from the file affiliation column of the deduplication table by determining all entries with the same inode and inode generation number and determining the position number.

In another embodiment, an independent file server may be connected to a WAN comprising a local file storage, a the system and a deduplication module, wherein the file system has information about directory structures, path and file names of other file systems of other file servers connected to the WAN, wherein the deduplication module is configured to communicate with other deduplication nodules of other file servers connected to the WAN, wherein the deduplication module performs data deduplication of data objects stored locally in the local file storage, creates and maintains a deduplication table mapping data chunks of locally stored data objects to identification characteristics and storage location in the local file storage, and construction plans of data files including locations of data chunks within the data files.

When the file server acts as home file server, a corresponding deduplication module performs the following operations: creating and maintaining of a complete set of identification characteristics for a corresponding data file assigned to the home file server and stored in the local file storage, receiving a request to transmit a first complete list of identification characteristics for the data file to a remote file server, creating the first complete list of identification characteristics for the data file by determining corresponding data chunks and identification characteristics of the requested data file using the deduplication table, transmitting the first complete list of identification characteristics for the data file to the remote file server, receiving a first list of missing identification characteristics for the data file from the remote file server, and transmitting data chunks pertaining with identification characteristics of the first list of missing identification characteristics to the remote file server, receiving a second complete list of identification characteristics for the data file from the remote file server, creating a second list of missing identification characteristics by comparing the second complete list of identification characteristics with identification characteristics of data chunks of the deduplication table and determining missing identification characteristics of the data file in the deduplication table, transmitting the second list of missing identification characteristics to the remote file server, receiving data chunks pertaining to the second list of missing identification characteristics from the remote file server, and reconstructing the data file in the home file server based on the second complete list of identification characteristics and locations of data chunks within the data file.

When the file server acts as a remote file server, a corresponding deduplication nodule performs the following operations: receiving a request to read the data file located in a corresponding home file server, transmitting a request for a complete list of identification characteristics for the data file to the home file server, receiving the first complete list of identification characteristics of the requested data file from the home file server, creating the first list of missing identification characteristics by comparing the identification characteristics of the received first complete list of identification characteristics with identification characteristics of the deduplication table and determining missing identification characteristics in the deduplication table, transmitting the first list of missing identification characteristics to the home file server, receiving data chunks pertaining with the identification characteristics of the first list of missing identification characteristics from the home file server, reconstructing the data file based on the first complete list of identification characteristics of the requested data file, and locations of data chunks within the data file, providing access to the requested data file in the local file storage, receiving a request to write the data file to the home file server, creating a second complete list of identification characteristics of the data file; transmitting the second complete list of identification characteristics of the data file to the home file server, receiving the second list of missing identification characteristics from the home file server, and transmitting data chunks pertaining with identification characteristics of the second list of missing identification characteristics to the home file server.

In another embodiment, a data processing computer program product for execution in a data processing system may comprise computer readable program code configured for performing a method for transferring data files between at least two independent file servers when the program is run on the data processing system. In yet another embodiment, the computer program product may be stored on a computer-usable medium, and may comprise computer-readable program code for causing a computer to perform a method for transferring data files between at least two independent file servers when the program is run on the computer.

Embodiments of the present invention are focused on WAN caching scenarios where complexity is higher and a plurality of individual file servers manage the data deduplication, transmitting, and receiving processes. Data may be created at different independent file servers connected to the WAN. Embodiments describe a bi-directional deduplication method where a home file server for a first data file may be a remote file server for a second data file and a remote file server for the first data file may be a home file server for the second data file. This implies that a bi-directional awareness of remote data and identification characteristics is present in order to avoid duplication of data.

Embodiments may use path and file name in combination with two lists of identification characteristics to compose a construction plan for a file based on data chunks and their location within the data file.

The embodiments described herein optimize the usage of limited bandwidth of WANs by introducing multi-directional data deduplication among, a plurality of file servers configured in a WAN caching environment. Multi-directional means that any file server at any time is able to deduplicate data. During certain processes, such as replication or file access of remote files, any file server compares identification characteristics with other file servers and only requests or sends data chunks with non-identical identification characteristics. Because data deduplication reduces the amount of required storage capacity for a given set of data, less data is transmitted via the WAN which is conducive to the lower bandwidth and throughput of a WAN.

Embodiments teach data file handling in the WAN caching environment where at least one file system from one file server is logically coupled to at least one file system of another file server. Logically coupled means that the file system of one file server (remote) represents the file and directory structure of the file system of the other file server (home) without having all the files present (at the remote).

Each independent file server includes a novel deduplication module. The deduplication module is capable of deduplicating data stored locally in the file server according to prior art and includes a deduplication table mapping the chunks to identification characteristics like hash-digests and construction plans of files, so that the deduplicated data files may be reassembled. Each deduplication module is configured to communicate with other deduplication modules pertaining to file servers configured in a WAN caching environment and forms a deduplication grid. The deduplication modules implement a method for reading deduplicated data in a home file server by at least one remote file server and implements a method for writing deduplicated data in the home file server by the at least one remote file server.

The above described embodiments, as well as additional purposes, features, and advantages will become apparent in the following detailed written description.

As will be appreciated by one skilled in the art, aspects of the present invention may be embodied as a system, method or computer program product. Accordingly, aspects of the present invention may take the form of an entirely hardware embodiment, an entirety software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or block's.

FIG. 1 shows a WAN environment 1 comprising two independent file servers 200, 300, in accordance with one embodiment. Referring to FIG. 1, the shown embodiment employs an independent file server 200 or 300 connected to a wide area network 100. Each independent file server 200, 300 comprise local file storage 210, 310, a file system 220, 320 and a deduplication module 230, 330. The file system 220, 320 has information about directory structures, path and file names of other file systems 220, 320 of other file servers 200, 300 connected to the wide area network 100. In the shown embodiment a first file system 220 of a first independent file server 200 has information about directory structures, path and file names of a second file system 320 of a second independent file server 300 and vice versa.

Each deduplication module 230, 330 is configured to communicate with other deduplication modules 230, 330 of other file servers 200, 300 connected to the wide area network 100. The deduplication modules 230, 330 perform data deduplication of data objects stored locally in the local file storage 210, 310, create and maintain a deduplication table 235, 335 mapping data chunks of locally stored data objects to identification characteristics and storage location in the local file storage 210, 310, and construction plans of data files based on the data chunks.

The independent file servers 200, 300 are configured to act as home file server or as remote file server. An independent file server 200, 300 is determined by the corresponding local file storage 210, 310 where the data file is created and stored first. The other independent file servers 200, 300 connected to the wide area network 100 act as remote file server for this data file. The deduplication table 235, 335 of a home file server holds a complete set of identification characteristics for a corresponding data file stored in the local file storage 210, 310.

In case the file server 200, 300 acts as home file server a corresponding deduplication module 230, 330 performs following operations: Creating and maintaining of a complete set of identification characteristics for a corresponding data file assigned to the home file server 200, 300 and stored in the local file storage 210, 310; receiving a request to transmit a first complete list of identification characteristics for the data file to a remote file server 200, 300; creating the first complete list of identification characteristics for the data file by determining corresponding data chunks and identification characteristics of the requested data file using the deduplication table 235, 335; transmitting the first complete list of identification characteristics for the data file to the remote file server 200, 300; receiving a first list of missing identification characteristics for the data file from the remote file server 200, 300; and transmitting data chunks pertaining to identification characteristics of the first list of missing identification characteristics to the remote file server 300; receiving a second complete list of identification characteristics for the data file from the remote file server 300; creating a second list of missing identification characteristics by comparing the second complete list of identification characteristics with identification characteristics of data chunks of the deduplication table 235, 335 and determining missing identification characteristics of the data file in the deduplication table 235, 335; transmitting the second list of missing identification characteristics to the remote file server 200, 300; receiving data chunks pertaining to the second list of missing identification characteristics from the remote file server 200, 300; and reconstructing the data file in the home file server 290, 300 based on the second complete list of identification characteristics which is also describing the locations of data chunks within the data file.

In case the file server 200, 300 acts as remote the server a corresponding deduplication module 230, 330 performs following, operations: Receiving a request to read the data file located in a corresponding home file server 200, 300; transmitting a request for a complete list, of identification characteristics for the data file to the home file server 300; receiving the first complete list of identification characteristics of the requested data file from the home file server 200, 300; creating the first list of missing identification characteristics by comparing the identification characteristics of the received first complete list of identification characteristics with identification characteristics of the deduplication table 235, 335 and determining missing identification characteristics in the deduplication table 235, 335, transmitting the first list of missing identification characteristics to the home file server 200, 300; receiving data chunks pertaining with the identification characteristics of the first list of missing identification characteristics from the home file server 200, 300; reconstructing the data file based on the first complete list of identification characteristics of the requested data file, and the locations of data chunks within the data file; providing access to the requested data file in the local file storage 210, 310; receiving a request to write the data file to the home file server 200, 300; creating a second complete list of identification characteristics of the data file; transmitting the second complete list of identification characteristics of the data file to the home file server 200, 300, receiving the second list of missing identification characteristics from the home file server 200, 300; transmitting data chunks pertaining to identification characteristics of the second list of missing identification characteristics to the home file server 300.

The deduplication modules 230, 330 chunk a data object and calculate an identification characteristic for each data chunk using a cryptographic hash-Function, for example, wherein each data chunk is associated with a digest output by the cryptographic hash-Function. Common methods used to calculate an identity characteristic are cryptographic hash functions, whereby each chunk of data is associated with a Hash-digest. Cryptographic hash functions include Secure Hash Algorithm (SHA-1, SHA-256, SHA-512), Message Digest (MD5), etc. More about these cryptographic bash functions is shown in the following table, Table 1.

TABLE 1

Hash Functions and Size of Digest (Output)

| Algorithm | Output Size (bits) |
| --- | --- |
| GOST | 256 |
| HAVAL | 256/224/192/160/128 |
| MD2 | 128 |
| MD4 | 128 |
| MD5 | 128 |
| PANAMA | 256 |
| RadioGatun | Up to 19 words |
| RIPEMD | 128 |
| RIPEMD-128/256 | 128/256 |
| RIPEMD-160/320 | 160/320 |
| SHA-0 | 160 |
| SHA-1 | 160 |
| SHA-256/224 | 256/224 |
| SHA-512/384 | 512/384 |
| Tiger(2)-192/160/128 | 192/160/128 |
| WHIRLPOOL | 512 |

The home file server 200, 300 is determined by corresponding local file storage 210, 310 where the data file is created and stored first. If a first data file is created and stored in a first local file storage 210 of the first independent file server 200, the first independent file server 200 is the home file server of the first data file. If a second data file is created and stored in second local file storage 310 of the second independent file server 300, second independent file server 300 is the home file server of the second data file.

Compared to prior art WAN environments the novel WAN caching environment 1 adds the deduplication module 230, 330 for each independent file server 200, 300. The deduplication module 230, 330 performs data deduplication of all data stored or written in the local file storage 210, 310. Data files stored in the first independent file server 200 might be written by a first user 3 and data files stored in the second independent file server 300 filer might be written by a second user 5.

The data deduplication process which is performed by the deduplication module 230, 330 creates and maintains the deduplication table 235, 335 where it keeps track of the data chunks, their identity characteristic (i.e., HASH digests), their storage location and the construction plan for each file based on data chunks. This is whenever a new data file is written, an existing data file is changed or a data file is deleted in the first independent file server 200, the first deduplication module 230 updates the first deduplication table 235 accordingly. Likewise when data files are written, updated or deleted in second independent file server 300 the second deduplication module 330 updates the second deduplication table 335. In one embodiment the deduplication tables 235, 335 may have the structure shown in the following table, Table 2.

TABLE 2

Internal Structure of Deduplication Tables 235, 335

| Chunk Identity | Storage Location | File Affiliation |
| --- | --- | --- |
| ABC123456789 | /mnt/file1/chunk1 | Inode101.igen1:1<br>Inode102.igen1:5 |

The chunk identity in column 1 uniquely identifies a data chunk and might be represented by a cryptographic Hash value such as Message-Digest-5 or Secure Hash Algorithm 1024, per Table 1, above. The storage location in column 2 lists, where in the local file storage 210, 310 the data chunk is stored. The file affiliation in column 3 indicates to which data file the data chunk belongs and at which position of the data file the data chunk has to be placed. The file affiliation in column 3 essentially contains the data file construction plan based on data chunks. There can be multiple entries in one field of this column 3. For example the second row and third column of table 1 indicates that this data chunk with identifier ABC123456789 belongs to the data file (Inode101.igen1:1) with the inode ID 101, the inode generation number 1 and must be placed at position 1; and to data file (Inode102.igen1:5) with the inode ID 102, the inode generation number 1 and must be placed at position 5. Using the inode number and inode generation number in the file affiliation field (column 3 of table 2) provides a unique method for mapping data chunks to data files.

In an alternative embodiment the data file affiliation may comprise the path and the file name, which is consistent at a certain point of time, but can change, while the inode number and inode generation number is constant throughout a data file lifecycle.

The construction plan for a given data file can be derived from the column 3 of table 2 by determining all entries with the same inode and inode-generation number and determining the position number. When column 3 is not sorted by the position number in an ascending order then the data chunks pertaining to a given data file and their storage location can be determined front column 1 (chunk identity) and 2 (storage location).

In a further alternative embodiment, the deduplication tables 235, 335 may have the structure shown in the following, table, Table 3.

TABLE 3

Internal Structure of Deduplication Tables 235, 335

| Identity Characteristic | Position in File | File Name |
|---|---|---|
| a1433124ab34214 | 1 | text.txt |
| b14314b264235c5 | 2 | Text.txt |

In the WAN caching environment 1, data files are sent from one independent file server 200, e.g. home file server, to another independent file server 300, e.g. remote file server, in a deduplicated manner to preserve bandwidth of the WAN 100. Each of the requests (e.g. read request or write request) comprises a path and a file name of the requested data file. The requests may be generated based on schedule, on an event on the data file and/or on a user command. The event could be a write or update or delete operation, for example. The deduplication modules 230, 330 update the corresponding deduplication tables 235, 335 whenever a new data file is written to local file storage 210, 310 of a corresponding file server 200, 300 or a data file existing in the local file storage 210, 310 of the corresponding, file server 200, 300 is changed or deleted.

Figure 2:
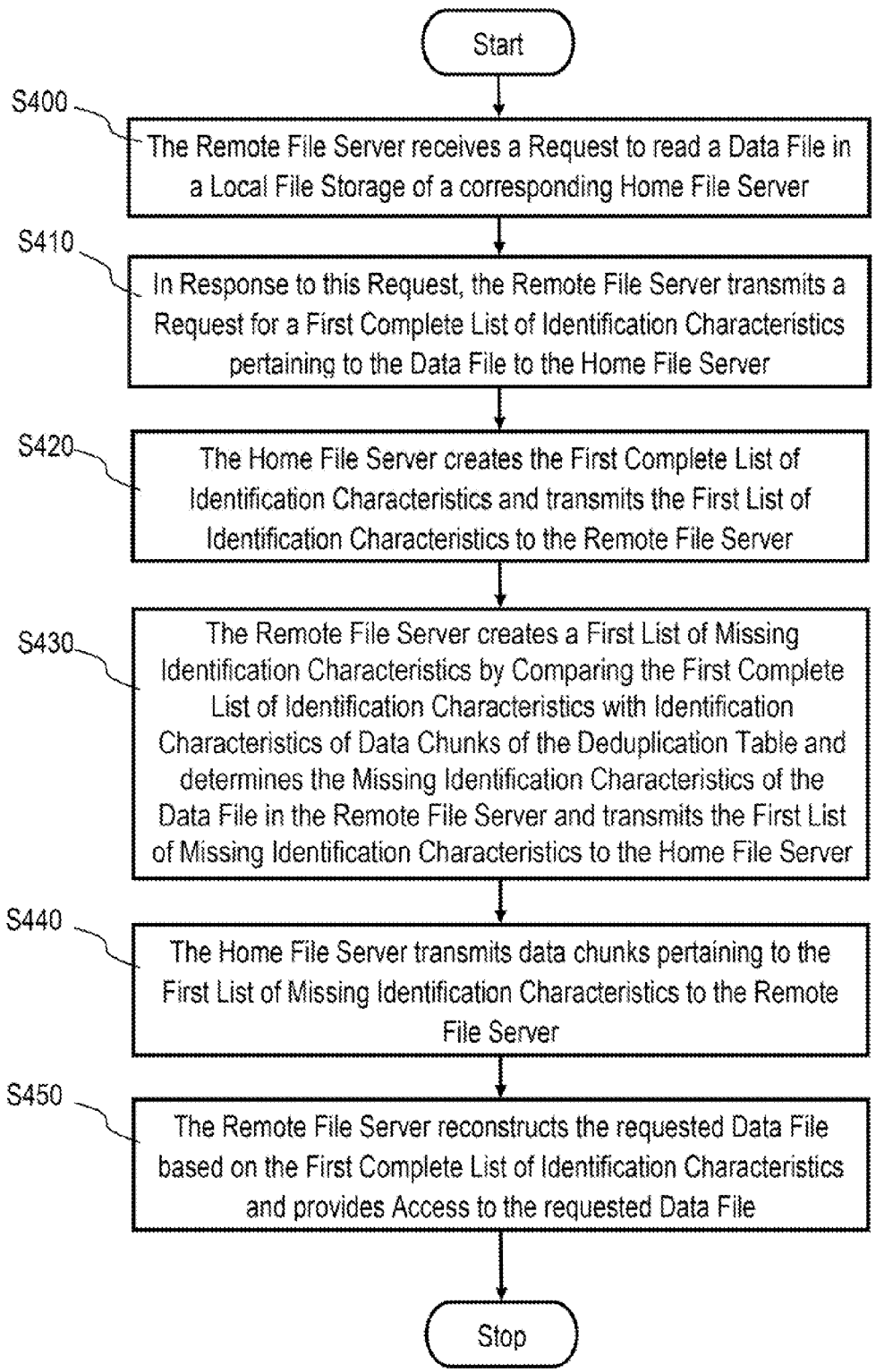
FIG. 2 is a schematic flow diagram of a data read process as part of a method for data file handling in a network environment, in accordance with one embodiment.
Figure 3:
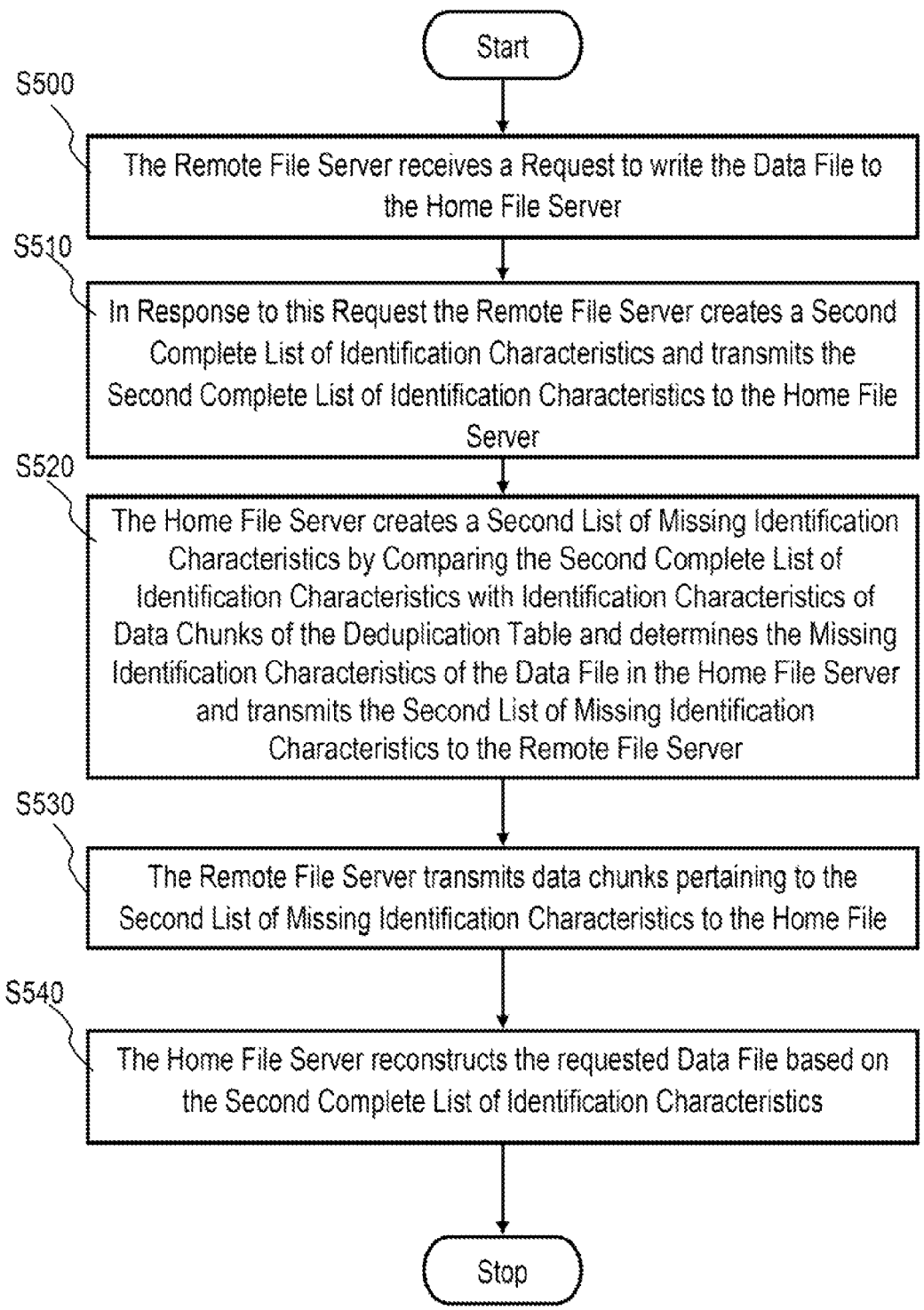
FIG. 3 is a schematic flow diagram of a data write process as part of the method for data file handling in a network environment, in accordance with one embodiment.

FIG. 2 shows a data read process being part of a method for data file handling in a network environment, in accordance with one embodiment; and FIG. 3 shows a data write process being part of the method for data file handling in a network environment, in accordance with another embodiment. To simplify the description of the shown embodiment of the method for data file handling in a network environment 1, the first file server 200 is the home file server of the data file and the second file server 300 is the remote file server.

Referring to FIGS. 2 and 3, according to the method for data file handling in a network environment 1, the remote file server 300 receives a request in step S400 to read a data file located in the first local the storage 210 of the home file server 200. In response to this request the remote file server 300 transmits a request for a first complete list of identification characteristics pertaining to the data file to the home file server 200 in step S410. In step S420 the home file server 200 creates the first complete list of identification characteristics for the data the and transmits the first complete list of identification characteristics to the remote file server 300. In step S430 the remote file server 300 creates a first list of missing identification characteristics by comparing the first complete list of identification characteristics with identification characteristics of data chunks of the second deduplication table 335 (see first column of Table 2, for example) and determining missing identification characteristics of the data file in the second local file storage 310 of the remote file server 309, and transmits the first list of missing identification characteristics to the home file server 200. In step S440 the home file server 200 transmits data chunks pertaining to the first list of missing identification characteristics to the remote file server 300. In step S450 the remote file server 300 reconstructs the requested data file based on the first complete list of identification characteristics and locations of data chunks within the data file; and provides access to the requested data file.

In step S500 of FIG. 3, the remote the server 300 receives a request to write the data file to the home file server 200. In response to this request, the remote file server 300 creates a second complete list of identification characteristics of the data file, and transmits the second complete list of identification characteristics to the home file server 200 in step S510. In step S520 the home file server 200 creates a second list of missing identification characteristics by comparing the second complete list of identification characteristics with identification characteristics of data chunks of the first deduplication table 235 (see first column of Table 2, for example) and determining missing identification characteristics of the data file in the first local file storage 210 of the home file server 200; and transmits the second list of missing identification characteristics to the remote file server 300. In step S530, the remote file server 300 transmits data chunks pertaining to the second list of missing identification characteristics to the home file server 200. In step S540, the home file server 200 reconstructs the data file based on the second complete list of identification characteristics and the locations of data chunks within the data file.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing, the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data file handling in a network environment, the method comprising:
   receiving, by a hardware processor, a request at a remote file server to read a data file located in a local file storage of a corresponding home file server;
   transmitting, by the hardware processor, a request from the remote file server to the home file server for a first complete list of identification characteristics pertaining to the data file;
   creating, by the hardware processor, the first complete list of identification characteristics for the data file in the home file server;
   transmitting, by the hardware processor, the first complete list of identification characteristics from the home file server to the remote file server;
   creating, by the hardware processor, a first list of missing identification characteristics in the remote file server by comparing the first complete list of identification characteristics with identification characteristics of data chunks of a deduplication table and determining missing identification characteristics of the data file in the remote file server, wherein each deduplication table comprises a first column with identification characteristics uniquely identifying a corresponding data chunk, a second column with storage location information of the corresponding data chunk in the local file storage, and a third column with file affiliation indicating to which files the corresponding data chunk belongs and at which file position the corresponding data chunk is to be placed, and wherein the file affiliation of the third column comprises an inode and an inode generation number of a corresponding data file and a file position at which the corresponding data chunk is to be placed;

transmitting, by the hardware processor, the first list of missing identification characteristics from the remote file server to the home file server;

transmitting, by the hardware processor, data chunks pertaining to the first list of missing identification characteristics from the home file server to the remote file server;

reconstructing, by the hardware processor, the requested data file in the remote file server based on the first complete list of identification characteristics and location of data chunks within the data file; and providing, by the hardware processor, access to the requested data file in the remote file server.

2. The method as recited in claim 1, further comprising:
receiving a request at the remote file server to write the data file to the home file server;

creating a second complete list of identification characteristics of the data file in the remote file server;

transmitting the second complete list of identification characteristics from the remote file server to the home file server;

creating a second list of missing identification characteristics in the home file server by comparing the second complete list of identification characteristics with identification characteristics of data chunks of the deduplication table and determining missing identification characteristics of the data file in the home file server;

transmitting the second list of missing identification characteristics from the home file server to the remote file server;

transmitting data chunks pertaining to the second list of missing identification characteristics from the remote file server to the home file server; and reconstructing the data file in the home file server based on the second complete list of identification characteristics and location of data chunks within the data file.

3. The method as recited in claim 1, wherein the network environment comprises at least two independent file servers connected via a network, wherein each file server comprises a local file storage, a file system, and a deduplication module.

4. The method as recited in claim 3, wherein a home file system of the home file server comprises information about directory structures, path, and file names of a remote file system of the remote file server, wherein the remote file system of the remote file server comprises information about directory structures, path, and file names of the home file system of the home file server, and wherein the deduplication modules are configured to communicate with each other and to create and to maintain deduplication tables mapping data chunks of locally stored data objects to identification characteristics and storage locations, and construction plans of data files based on the data chunks.

5. The method as recited in claim 4, wherein each data file is assigned to a certain independent file server acting as home file server for that corresponding data file, wherein the deduplication table of the home file server holds a complete set of identification characteristics for a corresponding data file stored in the local file storage.

6. The method as recited in claim 1, wherein the home file server is determined by a corresponding local file storage where the data file is created and stored first.

7. The method as recited in claim 1, wherein each of the read and write requests comprises a path and a file name of a requested data file.

8. The method as recited in claim 1, wherein at least one read or write request is generated based on a schedule.

9. The method as recited in claim 1, wherein at least one read or write request is generated based on an event on the data file, wherein the event is a write, update, or delete operation.

10. The method as recited in claim 1, wherein at least one read or write request is generated based on a user command.

11. The method as recited in claim 1, wherein each deduplication module chunks a data object and calculates an identification characteristic for each data chunk using a cryptographic hash-function, and wherein each data chunk is associated with a digest output by the cryptographic hash-function.

12. The method as recited in claim 11, wherein each deduplication module updates a corresponding deduplication table whenever a new data file is written to a corresponding file server or a data file existing in the corresponding file server is changed or deleted.

13. The method as recited in claim 1, wherein a data file is derived from the file affiliation column of the deduplication table by determining all entries with a same inode and inode generation number and determining a position number.

14. A computer program product, the computer program product comprising a computer readable storage medium having program instructions embodied therewith, wherein the computer readable storage medium is not a transitory signal per se, the program instructions being executable by the processor to perform the method as recited in claim 1.

15. An independent file server connected to a wide area network (WAN), the file server comprising:
local file storage;
a file system comprising information about directory structures, path, and file names of other file systems of other file servers connected to the WAN; and
a deduplication module configured to:
communicate with other deduplication modules of other file servers connected to the WAN;
perform data deduplication of data objects stored locally in the local file storage; and
create and maintain a deduplication table mapping data chunks of locally stored data objects to identification characteristics and storage location in the local file storage, and construction plans of data files including locations of data chunks within the data files,
wherein each deduplication table comprises a first column with identification characteristics uniquely identifying a corresponding data chunk, a second column with storage location information of the corresponding data chunk in the local file storage, and a third column with file affiliation indicating to which files the corresponding data chunk belongs and at which file position the corresponding data chunk is to be placed, and wherein the file affiliation of the third column comprises an inode and an inode generation number of a corresponding data file and a file position at which the corresponding data chunk is to be placed.

16. The independent file server as recited in claim 15, wherein when the file server acts as a home file server, a corresponding deduplication module is configured for:
   creating and maintaining of a complete set of identification characteristics for a corresponding data file assigned to the home file server and stored in the local file storage;
   receiving a request to transmit a first complete list of identification characteristics for the data file to a remote file server;
   creating the first complete list of identification characteristics for the data file by determining corresponding data chunks and identification characteristics of a requested data file using the deduplication table;
   transmitting the first complete list of identification characteristics for the data file to the remote file server;
   receiving a first list of missing identification characteristics for the data file from the remote file server; and
   transmitting data chunks pertaining to identification characteristics of the first list of missing identification characteristics to the remote file server;
   receiving a second complete list of identification characteristics for the data file from the remote file server;
   creating a second list of missing identification characteristics by comparing the second complete list of identification characteristics with identification characteristics of data chunks of the deduplication table and determining missing identification characteristics of the data file in the deduplication table;
   transmitting the second list of missing identification characteristics to the remote file server;
   receiving data chunks pertaining to the second list of missing identification characteristics from the remote file server; and
   reconstructing the data file in the home file server based on the second complete list of identification characteristics, and the locations of data chunks within the data file.

17. The independent file server as recited in claim 16, wherein when the file server acts as a remote file server, a corresponding deduplication module is configured for:
   receiving a request to read the data file located in a corresponding home file server;
   transmitting a request for a complete list of identification characteristics for the data file to the home file server;
   receiving the first complete list of identification characteristics of the requested data file from the home file server;
   creating the first list of missing identification characteristics by comparing the identification characteristics of the received first complete list of identification characteristics with identification characteristics of the deduplication table and determining missing identification characteristics in the deduplication table;
   transmitting the first list of missing identification characteristics to the home file server;
   receiving data chunks pertaining with the identification characteristics of the first list of missing identification characteristics from the home file server;
   reconstructing the data file based on the first complete list of identification characteristics of the requested data file, and locations of data chunks within the data file;
   providing access to the requested data file in the local file storage;
   receiving a request to write the data file to the home file server;
   creating a second complete list of identification characteristics of the data file;
   transmitting the second complete list of identification characteristics of the data file to the home file server;
   receiving the second list of missing identification characteristics from the home file server; and
   transmitting data chunks pertaining with identification characteristics of the second list of missing identification characteristics to the home file server.

* * * * *